United States Patent [19]

Minakawa et al.

[11] Patent Number: 4,981,357

[45] Date of Patent: Jan. 1, 1991

[54] SPECTROPHOTOMETER HAVING FUNCTIONS OF BOTH A DOUBLE-MONOCHROMATER AND A SINGLE-MONOCHROMATER

[75] Inventors: Sadao Minakawa, Mito; Yoshisada Ebata, Katsuta, both of Japan

[73] Assignee: Hitachi, Ltd., Tokyo, Japan

[21] Appl. No.: 409,763

[22] Filed: Sep. 20, 1989

[30] Foreign Application Priority Data

Oct. 18, 1988 [JP]  Japan ................................. 63-262014

[51] Int. Cl.⁵ ............................. G01J 3/18; G01J 3/42
[52] U.S. Cl. ................................... 356/325; 356/333
[58] Field of Search ............... 356/331, 332, 333, 334, 356/319, 323, 325

[56] References Cited

U.S. PATENT DOCUMENTS

| | | | |
|---|---|---|---|
| 3,730,626 | 5/1973 | Cruvellier et al. | 356/333 |
| 3,927,944 | 12/1975 | Iwahashi et al. | 356/325 |
| 4,227,079 | 10/1980 | Dukes et al. | 356/319 |
| 4,468,121 | 8/1984 | Koizumi et al. | 356/333 |

FOREIGN PATENT DOCUMENTS

| | | |
|---|---|---|
| 53-76978 | 11/1978 | Japan . |
| 54-163987 | 11/1979 | Japan .................................. 356/333 |

*Primary Examiner*—F. L. Evans
*Attorney, Agent, or Firm*—Antonelli, Terry, Stout & Kraus

[57] ABSTRACT

A spectrophotometer having functions of both of a double-monochromator and a single-monochromator including a light source, a first spectroscope having a first slit through which light from the light source passes and a first dispersion element for dispersing the light from the first slit, a second spectroscope having a second slit for receiving light dispersed from the first dispersion element for dispersing the light from the second slit, and a third slit for receiving the light dispersed from the second dispersion element. A sample compartment is provided for transmitting the light from the first dispersion element or from the third slit directly to a detector or through a sample to the detector. An optical unit is provided for changing transmitting light paths between a first light path for transmitting the light from the first dispersion element to the sample compartment through a fourth slit and a second light path for transmitting the light from the third slit to the sample compartment. A length of a light path from the first dispersion element to the second slit is equal to a length of a light path from the first dispersion element to the fourth slit.

5 Claims, 3 Drawing Sheets

SPECTROPHOTOMETER HAVING FUNCTIONS OF BOTH A DOUBLE-MONOCHROMATER AND A SINGLE-MONOCHROMATER

BACKGROUND OF THE INVENTION

The present invention relates to a spectrophotometer and, more particularly to a spectrophotometer which is used as a double-monochromator or a single-monochromator.

The most popular double-monochromator is constructed with two spectroscopes disposed in series, each having a dispersion element and reflection mirrors and is used only as a double-monochromator. On the other hand, a single-monochromator has one spectroscope and some reflection mirrors and is used only as a single-monochromator.

The U.S. Pat. Nos. 3,730,626, 3,927,944 and 4,277,079 and Japanese Utility-Model Laid-open No. 5376978 (1978) are cited as examples of such devices.

But the conventional technique as described above has the following drawbacks. The conventional double-monochromator is generally characterized by little stray light, because it has the two spectroscopes disposed in series. As a typical dispersion element installed in the spectroscope, a diffraction grating or a prism is generally used.

When detecting the light passed through a concentrated sample, the light energy is small, but since the double-monochromator has the two spectroscopes disposed in series as stated above, the stray light is removed effectively and further the purity of the detected monochromatic light becomes higher. Therefore, the signal to noise ratio of the detected light becomes higher of detecting the light passed through a concentrated liquid sample.

But, when detecting the light passed through a liquid sample which is not concentrated, the energy of the light detected by the double-monochromator becomes smaller and more stray light generates so as to make the signal to noise ratio of the detected light lower.

On the contrary, the single-monochromator detects more stray light, but the energy of the detected light increases. So, the signal to noise ratio of the single-monochromator is higher than that of the double-monochromator in the case of detecting the light from the liquid sample which is not concentrated.

Therefore, a user needs to use both functions of the two monochromators, and must own both of a single-monochromator and a double-monochromator, but it is expensive for the user.

SUMMARY OF THE INVENTION

The present invention has as an object the overcoming of the above mentioned problem of the conventional technique.

Another object of present invention is to provide a spectrophotometer which is used as a double-monochromator in one time and is further used as a single-monochromator in another time.

In order to attain the above object, a spectrophotometer in the present invention is constructed with a light source, a first spectroscope having a first slit through which light from the light source passes and a first dispersion element which disperses the light from the first slit, a second spectroscope having a second slit through which the light dispersed from the first dispersion element passes, a second dispersion element which disperse the light the second slit and a third slit through which the light dispersed from the second dispersion element passes, a sample compartment which transmit the light from the first dispersion element or the third slit to a detector through a sample or directly to the detector, and an optical unit which changes light paths between a first light path which transmits the light from the first dispersion element through a fourth slit and a second light path which transmits the light from the third slit to the sample compartment, in which the length of the light path from the first dispersion element to the second slit is equal to that of the first dispersion element to the fourth slit to the sample compartment. The transmitting light path of the light dispersed from the first dispersion element stated above is manually or automatically changed by attaching the optical unit using sliding mechanism thereof to the spectrophotometer constructed with the first and second spectroscope and the sample compartment.

DETAILED DESCRIPTION OF THE PREFERRED EMBODIMENTS

Figure 1:
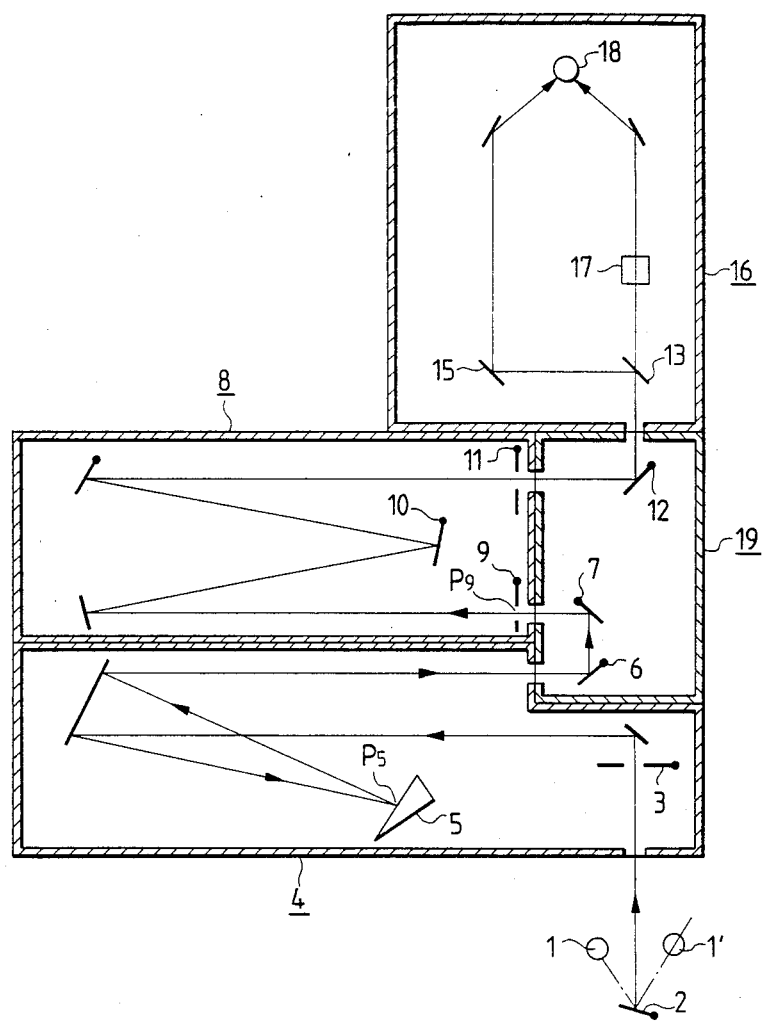
FIG. 1 is a diagrammatic view of one embodiment of the spectrophotometer of the present invention being used as a double-monochromator.

In FIG. 1, the light irradiated from the light source 1 or 1' reflected by a converging mirror 2 is transmitted to the spectroscope 4. The light transmitted to a spectroscope 4 passes through a slit 3 and reaches a prism 5 so as to be dispersed. The light dispersed by the prism 5 is reflected by reflection mirrors 6, 7 disposed in an optical unit 19 and is transmitted to a slit 9 disposed in an entrance of a spectroscope 8 so as to take out monochromatic light from the slit 9. The monochromatic light from the slit 9 is transmitted to a diffraction grating 10 so as to be dispersed further. The monochromatic light dispersed by the diffraction grating 10 passes through a slit 11 disposed in the spectroscope 8 so as to be taken out from the slit 11 as a pure monochromatic light which has higher purity than the monochromatic light from the slit 9. The pure monochromatic light from the slit 11 is reflected by a reflection mirror 12 disposed in the optical unit 19 and transmitted to a rotational mirror 13 in a sample compartment 16. The pure monochromatic light from the slit 11 passes through a sample 17 and reaches a light detector 18 at one time and is reflected by a reflection mirror 15 so as to directly reach the light detector 18 at another time. The rotational mirror 13, the reflection mirrors 15 and sample 17 are disposed in the sample compartment 16.

The optical unit 19 of the spectrophotometer in FIG. 1 is removable by using the sliding mechanism thereof. Removing the optical unit 19 of the spectrophotometer in FIG. 1 and attaching an optical unit 20 to the spectrophotmeter in FIG. 1, a spectrophotometer shown in FIG. 2 is obtained.

Figure 2:
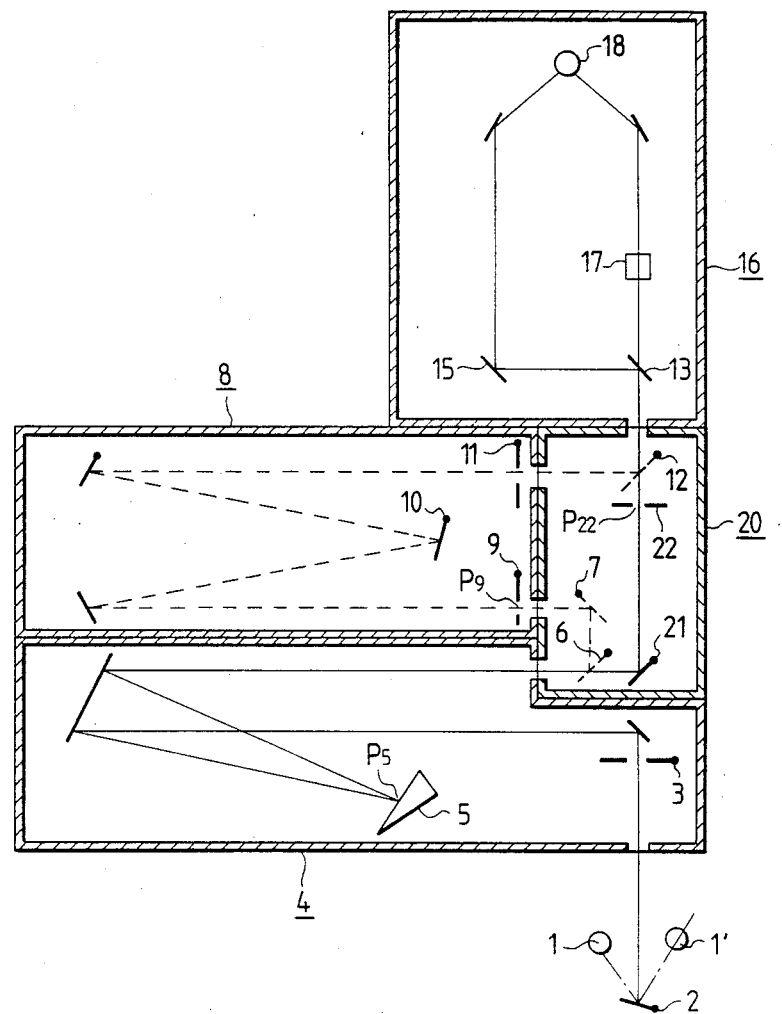
FIG. 2 is a diagrammatic view of one embodiment of the spectrophotometer of the present invention being used as a single-monochromator.

In FIG. 2, the light dispersed by the prism 5 is transmitted to a slit 22 after reflecting by a reflection mirror 21 so as to be taken out as a monochromatic light from the slit 22, wherein the slit 22 and the reflection mirror 21 are disposed in the optical unit 20 and the optical unit 20 is attached to the spectrophtometer.

The monochromatic light from the slit 22 is transmitted to the sample compartment 16 which is operated as same way as that in FIG. 1. So, the spectrophotometer in FIG. 2 is operated as a single-monochromator.

In FIG. 2, mirrors 6, 7 and 12 and the light path from the mirror 6 to the mirror 12 are shown as a reference with dotted line. But they do not exist in the spectrophotometer in FIG. 2.

The slit 9 and the slit 22 are respectively disposed in the spectroscope 8 or the optical unit 20 so as to make the light path from the reflecting position $P_5$ of the prism 5 to position $P_9$ of the slit 9 equal to that from the reflecting position $P_5$ to position $P_{22}$ of the slit 22. And the slit 22 in the optical unit 20 in addition to the slit 9 of the spectroscope 8 is spectroscopes 4 and 8 the because characteristics of the dispersion elements 5, 10 are different each other and the respective dispersion elements 5, 10 are independently controlled. If the slit 9 of the double-monochromator is used as the slit 12 of the single-monochromator too, the width and position of the slit 9 is controlled depending on the utility of the spectrophotometer as the double-monochromator or the single-monochromator. It is very complicated and difficult to control the slit 9 with high accuracy. Therefore, the slit 22 is independently provided in the optical unit 20 in addition to the slit 9 in the spectroscope 8.

Figure 3:
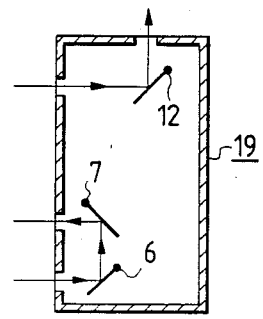
FIG. 3 is a diagrammatic view of the optical unit used in the spectrophotometer in FIG. 1.
Figure 4:
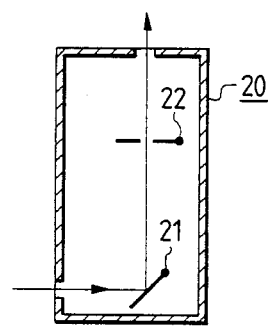
FIG. 4 is a diagrammatic view of the optical unit used in the spectrophotometer in FIG. 2.

FIG. 3 shows a diagrammatic view of the optical unit 19 in FIG. 1 which is used so as to construct the double-monochromator and FIG. 4 shows a diagrammatic view of the optical unit 20 in FIG. 2 which is used as the single-monochromator. The optical units 19 and 20 are separate two units, but they can be one unit having both functions of the optical units 19 and 20 which is exchanged to either one of the functions. For example, an optical unit having reflection mirrors 6, 7 and 12 shown by the dotted line with the reflection mirror 21 and the slit 22 can be obtained as such embodiment, wherein the mirrors 6 and 12 are positioned so as to transmit the light as either way shown with the solid line or the dotted line.

Further, exchanging of the optical units 19 and 20 or the light paths of the solid line and dotted line in the one optical unit are operated manually or automatically.

As stated above, the spectrophotometer of the present invention is used as both the double-monochromator and single-monochromator in one set and can measure the sample with fully high accuracy in each use.

We claim:

1. A spectrophotometer having functions of both of a double-monochromator and a single-monochromator, comprising:
   a light source;
   a first spectroscope having a first slit through which light from the light source passes and a first dispersion element for dispersing the light from the first slit;
   a second spectroscope having a second slit for receiving the light dispersed from the first dispersion element, a second dispersion element for dispersing the light from the second slit, and a third slit for receiving the light dispersed from the second dispersion element;
   a sample compartment for transmitting the light from the first dispersion element or from the third slit directly to a detector or through a sample to the detector; and
   an optical unit for changing transmitting light paths between a first light path for transmitting the light from the first dispersion element to the sample compartment through a fourth slit and a second light path for transmitting the light from the third slit to the sample compartment;
   wherein a length of a light path from the first dispersion element to the second slit is equal to a length of a light path from the first dispersion element to the fourth slit.

2. A spectrophotometer according to claim 1, wherein the optical unit is attached to the first spectroscope and the sample compartment for transmitting the light dispersed from the first dispersion element directly to the sample compartment.

3. A spectrophotometer according to claim 1, wherein the optical unit is slidably attached to the first spectroscope and the second spectroscope for transmitting the light dispersed from the first dispersion element to the second slit and for transmitting the light from the third slit to the sample compartment.

4. A spectrophotometer having functions of both of a double-monochromator and a single-monochromator, comprising:
   a light source;
   a first spectroscope having a first slit to which light from the light source passes and a first dispersion element for dispersing the light from the first slit;
   a second spectroscope having a second slit for receiving the light dispersed from the first dispersion element, a second dispersion element for dispersing the light from the second slit, and a third slit for receiving the light dispersed from the second dispersion element;
   a sample compartment for transmitting the light from the first dispersion element or from the third slit directly to a detector or through a sample to the detector;
   a first optical unit being attached to the first spectroscope and the sample compartment for transmitting the light dispersed from the first dispersion element to the sample compartment through a fourth slit; and
   a second optical unit being attached to the first spectroscope and the second spectroscope for transmitting the light dispersed from the first dispersion element to the second slit and for transmitting the light from the third slit to the sample compartment;
   wherein a length of a light path from the first dispersion element to the second slit is equal to a length of a light path from the first dispersion element to the fourth slit.

5. A spectrophotometer according to claim 4, further comprising exchanging means for automatically exchanging the first optical unit and the second optical unit.

* * * * *